US007209988B2

United States Patent
Chalopin et al.

(10) Patent No.: US 7,209,988 B2
(45) Date of Patent: Apr. 24, 2007

(54) MANAGEMENT OF THE FREEZING OF A FUNCTIONAL MODULE IN A SYSTEM ON A CHIP

(75) Inventors: Hervé Chalopin, Aubagne (FR); Laurent Tabaries, Aubagne (FR)

(73) Assignee: STMicroelectronics S.A., Montrouge (FR)

( * ) Notice: Subject to any disclaimer, the term of this patent is extended or adjusted under 35 U.S.C. 154(b) by 152 days.

(21) Appl. No.: 11/127,793

(22) Filed: May 12, 2005

(65) Prior Publication Data

US 2005/0268013 A1    Dec. 1, 2005

(30) Foreign Application Priority Data

May 13, 2004    (FR)    ................................... 04 05211

(51) Int. Cl.
*G06F 13/42* (2006.01)
*G06F 9/00* (2006.01)
*G06F 9/46* (2006.01)
*H04L 29/06* (2006.01)
*H04J 3/08* (2006.01)
*G06F 15/163* (2006.01)
*H04L 12/40* (2006.01)

(52) U.S. Cl. ........................ 710/105; 710/112; 712/32; 718/107

(58) Field of Classification Search ................ 710/105, 710/112, 200, 1–6, 15; 702/123; 703/21; 714/45; 719/328; 718/107; 370/543; 712/32–33
See application file for complete search history.

(56) References Cited

U.S. PATENT DOCUMENTS

| | | | | |
|---|---|---|---|---|
| 5,553,268 A | * | 9/1996 | Willenz et al. ............. 711/158 |
| 5,577,214 A | * | 11/1996 | Bhattacharya ............. 710/107 |
| 6,507,592 B1 | * | 1/2003 | Hurvig et al. ............. 370/503 |
| 7,023,979 B1 | * | 4/2006 | Wu et al. ............. 379/265.11 |
| 7,120,712 B2 | * | 10/2006 | Wingard et al. ............ 710/106 |

(Continued)

FOREIGN PATENT DOCUMENTS

FR          2 832 565          5/2003

OTHER PUBLICATIONS

"Performance of global positioning system (GPS) on-orbit Navstar clocks" by McCaskill et al. (abstract only) Publication Date: May 31-Jun. 2, 1995.*

*Primary Examiner*—Gopal C. Ray
(74) *Attorney, Agent, or Firm*—Lisa K. Jorgenson; Robert Iannucci; Seed IP Law Group PLLC (57) ABSTRACT

An electronic system comprises an initiator module and a target module addressable by the initiator module. The initiator module is activated by edges of an activation signal generated from a first clock signal having a frequency. A control module is activated by edges of a second clock signal having a frequency, which is at least twice as large as the frequency of the first clock signal. The control module is constructed so as, in response to a request for access to the target module, initiated by the initiator module on an active edge of the activation signal, to set a signal for blocking the activation signal before the next edge of the latter, and to reinitialize the blocking signal on the first active edge of the first clock signal which follows the indication by the target module that the processing of the request is terminated at the target module.

19 Claims, 3 Drawing Sheets

U.S. PATENT DOCUMENTS

2002/0129173 A1* 9/2002 Weber et al. ............... 709/310
2002/0184420 A1 12/2002 Maone et al. ............... 710/105
2004/0177186 A1* 9/2004 Wingard et al. ............ 710/105
2005/0268013 A1* 12/2005 Chalopin et al. ........... 710/112

* cited by examiner

MANAGEMENT OF THE FREEZING OF A FUNCTIONAL MODULE IN A SYSTEM ON A CHIP

BACKGROUND OF THE INVENTION

1. Field of the Invention

The present invention pertains in a general manner to the field of integrated-circuit digital electronic systems, called "Systems on a Chip" or SoC.

2. Description of the Related Art

More particularly, the invention relates to the management of the freezing of a functional module with the aim, for example, of waiting for the end of the execution of an operation by another functional module.

In a system on a chip, resources are conventionally shared between functional modules that have access thereto. A functional module such as this is sometimes called a virtual component or "Intellectual Property" block, or else IP block in the jargon of the person skilled in the art. It is designed to undertake a determined function, or is for general use (it may possibly be a microprocessor or a microcontroller). It can be embodied in the form of hardware elements and/or of software elements.

A distinction is made between modules of master type (hereinafter initiator modules), which take the initiative in exchanging data with one or more other modules, and modules of slave type (hereinafter target modules), whose role is to respond to the requests received from the initiator module which is in charge. Should there be a plurality of initiator modules, an arbitration unit (or arbiter) is responsible for arbitrating in respect of conflicting requests for access to a common resource originating from distinct initiator modules, so as to grant an exclusive right of access to the resource, to a determined one of the said initiator modules.

Conventionally, the functional modules communicate via at least one communication bus comprising a data bus, an address bus and a control bus. The processing of the request may begin with the implementation of a link setup procedure with mutual acknowledgements (otherwise known as "handshake"). The expression link setup procedure is understood to mean a procedure in the course of which the initiator module and the target module exchange control signals, until they are ready for the mutual transmission of data.

Nevertheless, there exist functional modules, in particular of initiator type, which make no provision for such a link setup procedure. To ensure high speed operation, certain initiator modules may in fact be designed to collect the response information from the target module by reading the data bus after a determined duration following the sending of an access request. This determined duration may be as brief as the duration of a clock cycle of the initiator module.

For example, the ST7 microcontroller from STMicroelectronics is designed to send a data read request by depositing on the address bus the address of the register targeted on an active edge of its activation signal (clock signal of the ST7), and to read the data present on the data bus (which are always assumed to be the data present) on the next active edge of the said activation signal, with no synchronization with the operation of the target module.

Such a protocol obviously operates only if the target module is fast enough to process the request within the duration of a cycle of the clock signal of the ST7. Such is not always the case in practice.

Moreover, if the target module provides for the execution of a link setup procedure before processing the request, then an interface and control module must be provided so as to effect the interface between the initiator module and the target module. The implementation of the link setup procedure between the interface module and the target module may take more time than the standby duration for which the initiator module waits (for example, for the ST7 microcontroller, the duration of a cycle of its clock signal).

In order to circumvent these difficulties, consideration may be given to "freezing" (that is to say disabling) the initiator module until the processing of the request by the target module is terminated, by including an instruction provided for this purpose in the microcode executed by the initiator module, subsequent to the instruction corresponding to the request. Such a freeze instruction exists in the instruction set of most microcontrollers and microprocessors. It is provided and used, in general, for placing the component in a standby mode or "frozen" mode, so as to reduce its energy consumption. For the ST7 microcontroller, these are for example the "WAIT" or "HALT" modes.

The execution of the freeze instruction may conventionally cause the blocking of the clock signal of the initiator module at the level of a module for generating clock signals of the system.

Nevertheless, the execution of the freeze instruction may itself take several clock cycles. In particular, the freezing of the microcontrollers and of the microprocessors requires the saving of their execution context, which must thereafter be restored during the "wakeup" (that is to say the re-enabling) of the component.

This implementation by software is therefore time and energy consuming, both in respect of the freezing and the waking up of the initiator module. It also follows that the actual freezing of the initiator module may occur too late, that is to say after the initiator module has read the data present on the data bus, wrongly believing it to be response data originating from the target module. The system is thereafter exposed to a risk of malfunctions.

BRIEF SUMMARY OF THE INVENTION

One embodiment of the invention solves the aforesaid problems of the prior art, by improving the speed of the freezing and waking up of a component such as an initiator module.

Thus, a first embodiment of the invention proposes an electronic system comprising an initiator module and at least one target module addressable by the said initiator module. The initiator module is activated by the edges of an activation signal generated from a first clock signal having a determined frequency. The system furthermore comprises a control unit activated by the edges of a second clock signal having a determined frequency, which is at least twice as large as the frequency of the first clock signal. Furthermore, the control unit is constructed so as, in response to an access request for access to the target module, initiated by the initiator module on a determined active edge of the activation signal, to set a signal for blocking the activation signal before the next edge of the latter, and to reinitialize the blocking signal on the first active edge of the first clock signal which follows the indication by the target module that the processing of the request is terminated at the level of the target module.

Thus, the initiator module activation signal is blocked by the blocking signal before changing logic state. The initiator module is therefore frozen without any lag. This solution, which is advantageously deployed in hardware form and not in software form, therefore solves the problem posed.

According to an embodiment, the system furthermore comprises an address bus on which an address of the target module is deposited by the initiator module as part of the request for access to the target module. The control unit can then advantageously be constructed so as to set the blocking signal with the aid of logic for decoding the said address of the target module. Advantageously, the selection signal serves both to notify the target module that it is the subject of an access request, and to generate the blocking signal.

According to an embodiment, the address decoding logic is constructed so as to set a signal for selecting the target module in case of decoding of the address of the target module. The control unit may then be constructed to generate the blocking signal on the basis of the said target module selection signal.

In a first form of embodiment, the address decoding logic is included in the control module. This renders the control module independent, in the sense that it can be reused in any type of practical implementation, in the guise of predesigned and pretested IP block.

In a variant in which the system comprises an address decoder which is coupled to the address bus, the address decoding logic is included in the address decoder. Thus, this embodiment of the invention uses already existing decoding logic.

The activation signal is advantageously generated in hardware fashion, by logic combination between the first clock signal and the blocking signal. When these signals are active in the logic 1 state, this logic combination is for example of OR type.

A second embodiment of the invention proposes a storage key comprising at least one non-volatile memory and a control circuit, characterized in that the control circuit is a circuit on a chip (SoC) forming a system according to the first embodiment hereinabove.

BRIEF DESCRIPTION OF THE SEVERAL VIEWS OF THE DRAWINGS

Other characteristics and advantages of the invention will become further apparent on reading the description which follows. The latter is purely illustrative and should be read in conjunction with the appended drawings, in which.

DETAILED DESCRIPTION OF THE INVENTION

The invention is described hereinafter in an exemplary application to a control circuit intended to manage a storage key or memory key.

A memory key forms a mass storage medium of small dimensions, mounted in a removable support taking the form of a key or key holder. This medium makes it possible to store and to transport, easily, a certain quantity of data, with the aim, for example, of transferring them from one computer to another. Such a memory key is in principle inserted into the USB ("Universal Serial Bus") ports of the computers. This is why it is also called a USB storage key, USB memory key or quite simply USB key.

Figure 1:
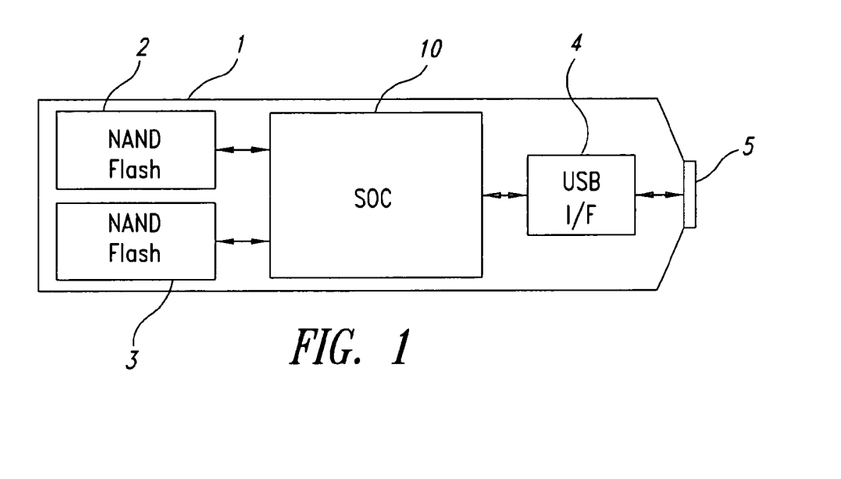
FIG. 1 is a schematic diagram of an exemplary memory key according to the second aspect of the invention.

In FIG. 1, such a memory key 1 comprises a control circuit 10, coupled to a USB type connector 5, via a USB interface circuit 4. Moreover, the circuit 10 is coupled to one or more nonvolatile memories 2, 3 of large capacity, which are for example memories of NAND-Flash or similar type. The circuit 10 is remotely energized when the memory key 1 is connected via the connector 5 to a computer (not represented) or similar. The interface circuit 4 may for example ensure compatibility with the USB 2.0 standard (standard for data exchange between general usage computers and their peripherals).

The control circuit may advantageously be a system on a chip (SoC), so as to satisfy a high degree of integration required by the miniaturization desired for electronic products of this kind.

Figure 2:
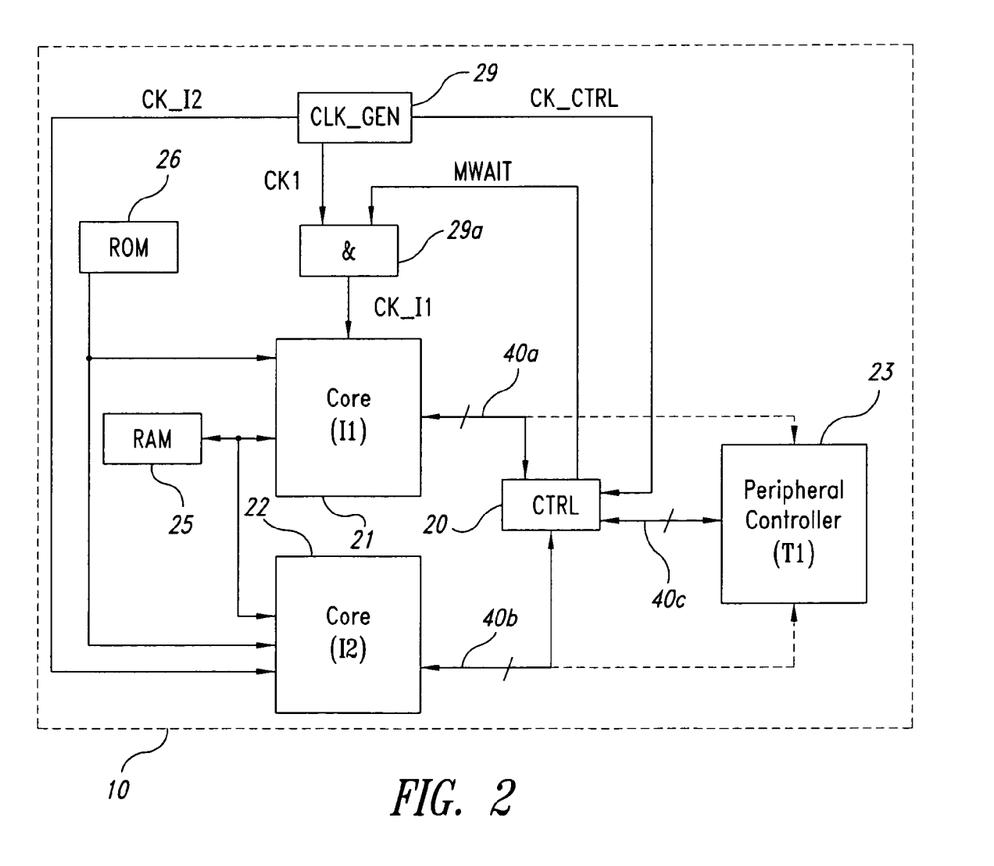
FIG. 2 is a schematic diagram of an exemplary electronic system according to the first aspect of the invention, which may be included in the memory key of FIG. 1.

FIG. 2 illustrates an exemplary architecture of such a system.

In this example, the system 10 comprises two cores 21 and 22, which are for example respectively a microcontroller such as the ST7 from STMicroelectronics, and a coprocessor dedicated to the control operations for the mass storage means formed by the internal memories 2 and 3. These cores 21 and 22 are designed as functional modules of initiator type (respectively I1 and I2).

A volatile memory (RAM—"Random Access Memory") 25, is used by the modules 21 and 22 to store temporary information, related to the application concerned. Moreover, a non-volatile memory (ROM—"Read Only Memory") 26 stores permanent data, in particular the code of the application which is loaded into the modules 21 and/or 22 on power-up.

The system 10 also comprises a peripheral controller 23, in particular a USB 2.0 function controller, such as the virtual component MUSBHSFC Inventra™ from Mentor Graphics, in the guise of functional module of target type (T1). This virtual component is compatible with the aforesaid VCI standard.

In an example, the module 23 comprises several data registers (not represented), which may be conventional registers or indexed registers. The target module 23 is addressable by the initiator modules 21 and 22, via a determined address value. For example, to access one of the registers of the module 23, an initiator module generates an access request comprising the corresponding address of a register of the module 23.

Both the microcontroller 21 and the coprocessor 22 may simultaneously have access, on request, to the data registers of the peripheral controller 23. Data may be exchanged between the initiator modules 21 and 22 on the one hand, and the target module 23 on the other hand, via a control module 20 which is linked to them in an ad hoc manner, for example by communication buses.

In an embodiment, the control module 20 is constructed to ensure the freezing and the waking up of the module 21, as will be explained in detail later.

In the example represented by continuous lines in FIG. 2, the control module 20 is linked to the modules 21, 22 and 23 by communication buses 40a, 40b and 40c respectively. The bus 40a is for example the communication bus of the ST7 microcontroller, whose communication protocol does not provide for any link setup procedure. The buses 40*b* and 40*c* are for example VCI OCB ("VCI On Chip Bus") buses whose communication protocol, in accordance with the specifications of the VCI ("Virtual Component Interface") standard of the VSIA ("Virtual Socket Interface Alliance"), Wakefield, Mass., United States, provides for a link setup procedure.

The control module 20 comprises a control unit (not represented) for ensuring the interface between the bus 40*a* of the ST7 and the VCI OCB bus.

Moreover, the controller 23 being a common resource shared by the two cores 21 and 22, the control module 20 comprises an arbitration unit (not represented) for arbitrating the conflicts between conflicting requests for access to the target module and granting an exclusive right of access to the resource to only one of the initiator modules concerned.

In variants symbolized by the dashed lines, the initiator module 21 and/or the initiator module 22 may be linked to the target module 23 via the buses 40*a* and 40*b* directly. In this case, the control module 20 does not provide for the interface between the protocol of the bus of the ST7 and the VCI protocol of the module 23. The module 21 must then comprise a VCI interface. The control module 20 is then dedicated to the function for freezing the module 21, which will be described in detail later.

The system 10 also comprises a circuit 29 for generating clock signals, or clock generator (CLK_GEN). The generator 29 produces, on the basis of a crystal oscillator (not represented), clock signals whose respective active edges activate the components of the system. Here, it is for example considered that the activation edges of all the clock signals are the rising edges.

In particular, the generator 29 produces a clock signal CK1, a clock signal CK_I2 for the activation of the initiator module 22, and a clock signal CK_CTRL for the activation of the control module 20. An activation signal CK_I1 of the initiator module 21 is generated by a logic element 29*a*, on the basis of the clock signal CK1. The frequency of the signal CK_I1 is for example equal to that of the clock signal CK1. The logic element 29*a* is for example included in the clock generator 21, or in the initiator module 21, or else in the control module 20 (for greater clarity and generality, it has been represented here in the guise of independent functional block). This is for example a logic gate of the OR type, which combines the clock signal CK1 received on a first input and a blocking signal MWAIT received on a second input, so as to deliver the signal CK_I1 as output. The blocking signal MWAIT is a logic signal generated by the control module 20 in a manner which will be described later. Stated otherwise, when the blocking signal is active (that is to say in the logic 1 state), it blocks the signal CK_I1 for activating the module 21 by holding it in the logic 1 state. The expression blocking the signal CK_I1 is understood to mean the disabling of this signal in a determined logic state, here the logic 1 state, the result of this being that this signal no longer exhibits any active edges for the activation of the initiator module 21. As a result, the initiator module 21 is frozen.

When the initiator module 21 is an ST7 microcontroller, the frequency of the clock signal CK1 is for example equal to 15 to 30 MHz, depending on the current operating mode of the microcontroller. The frequency of the signal CK_CTRL is at least twice as large as the maximum frequency of the clock signal CK1. In the abovementioned example, the frequency of the signal CK_CTRL may thus be equal to 60 MHz or more. This condition allows the control module 20 to block the signal CK_I1 in a time interval following an active edge of the signal CK1 which is less than half a period of the clock signal CK1, that is to say before the next edge (here a falling edge) of this signal.

Figure 3:
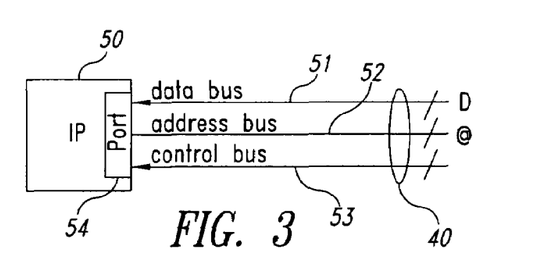
FIG. 3 is a diagram illustrating the coupling of a functional module to a communication bus.

The diagram of FIG. 3 illustrates the connection of any functional module 50 to a communication bus 40 which comprises channels for the communication of information between this module and another module of the system.

The communication bus 40 can thus comprise, in an example, a data bus 51, an address bus 52 and a control bus 53. In certain cases, the data bus 51 comprises a data sub bus for the reading of data, and a data sub bus for the writing of data. The functional module 50 comprises a communication port 54, which may be of master type or of slave type depending on whether the module 50 is of initiator type or of target type, respectively. The port 54 allows the linking of the module 50 to the communication bus 40.

The data bus 51 is used to transmit the data signals (D), which contain the information exchanged between the modules of the system.

The address bus 52 is used to transmit the values of addresses (@), which indicate the module in which the data transmitted over the data bus must be read or written, as well as possibly their location inside the module concerned.

Finally, the control bus 53 is used to transmit the control signals. Such signals serve in particular the initiator modules for making requests for access to registers in the target modules. They also serve the target modules for indicating the end of a transaction, and possibly the success or the failure of the transaction. Other control signals also serve to define the direction of the transaction (read or write), to synchronize the exchanges, etc.

A first embodiment of the control module 20 will now be described with reference to the diagram of FIG. 4 (for the sake of simplicity, only the connection of the control module 20 to the target module 23 and to the initiator module 21 are represented in this figure).

The controller 23 here being a common resource shared by the two cores 21 and 22, the control module 20 comprises an arbitration unit 24 (ARB). We denote thus I1_Req an access request signal delivered to the arbitration unit 24 by the initiator module 21 via the control bus 53 of the bus 40*a*. This signal is activated (that is to say set to its active state, for example the logic 1 state), when the initiator module 21 needs to access the target module 23. There is conflict when signals of this type received from more than one initiator module are active simultaneously. The arbitration unit 24 must arbitrate this conflict, so as to grant an exclusive right of access to the resource to only one of the initiator modules concerned.

For this purpose, the arbitration unit 24 implements an arbitration mechanism which may be of any known type, for example based on a circular permutation algorithm, a seniority algorithm or fixed priorities.

Additionally, the arbitration unit 24 receives a control signal Req_End for the target module 23, via the control bus 53 of the bus 40*c*. This signal is active (for example in the logic 1 state) to indicate that the processing by the target module of the request in progress is completed. Specifically, the arbitration unit 24 must not allow access to the target module by another initiator module before the processing of the request in progress has terminated. Stated otherwise, the exclusive right of access granted to an initiator module must be maintained until the end of the processing of the request for which it has been granted.

The control module 20 also comprises an address decoding logic unit 28 (@DEC). The latter receives an address @ via the address bus 52 of the bus 40*a*, which address is placed on this bus upon an access request initiated by the initiator module 21. This address identifies the data register concerned in the access request. It is assumed here that this is a register of the target module 23. In a manner known per se, the unit 28 generates a component selection signal T1_Sel, which is a control signal indicating to the target module 23 that the access request concerns one of its registers. The signal T1_Sel is transmitted to the module 23 via the control bus 53 of the bus 40c. Furthermore, the address @ is transmitted to the module 23 via the address bus 52 of the bus 40c.

The control module 20 finally comprises a control unit 27 (CU), the function of which is in particular to freeze and to wake up the initiator module 21 in response to a request for access to the target module 23 originating from the initiator module 21. The control unit also has the function of storing the parameters of the request when the initiator module 21 is frozen, and of retrieving them when the initiator module 21 is woken up. Thus, it is ensured that no item of information is lost during the period of time in the course of which the initiator module 21 is frozen. In an example, a request is stored at the atomic level, that is to say at the lowest protocol level, which is the level of an operation of the microcode corresponding to the request.

To fulfill its functions of storage and retrieval of the parameters of the request, the control unit 27 is coupled to the bus 40a, and to a buffer memory 29b of the control module 20. In particular, the data of the request are read by the control unit on the data bus 51 of the bus 40a, and are stored in the memory 29b, in response to the signal I1_Req and to the signal T1_Sel. Likewise, the address of the target module which is on the address bus 52 of the bus 40a, which address is deposited by the initiator module in the guise of part of the request, is read on this bus and is stored in the buffer memory 29b. Likewise, finally, the control data are read on the control bus 53 of the bus 40a and are stored in the buffer memory 29b.

To fulfill its function of freezing and waking up the initiator module 21, the control unit 27 is coupled to the control bus 53 of the communication bus 40a so as to receive the control signal I1_Req of the request. This allows it to determine that the target module 21 initiates a request. It is also coupled to the control bus 53 of the communication bus 40c so as to receive the end-of-execution of the request Req_End signal delivered by the target module 23. It again receives the signal T1_Sel delivered by the address decoding unit 28. This allows it to determine that the current request concerns the target module 23, so that it is necessary to freeze the initiator module. Finally, it delivers the blocking signal MWAIT which was presented earlier in regard to the diagram of FIG. 2.

The control unit 27 causes the freezing of the initiator module 21 by setting the signal MWAIT (that is to say by toggling it to the logic 1 state), in response to the signal I1_Req and to the setting of the signal T1_Sel (that is to say when T1_Sel=1).

Conversely, the control unit 27 causes the waking up of the initiator module 21 by reinitializing the signal MWAIT (that is to say by toggling it to the logic 0 state), in response to the setting of the signal Req_End (that is to say when Req_End=1).

Figure 4:
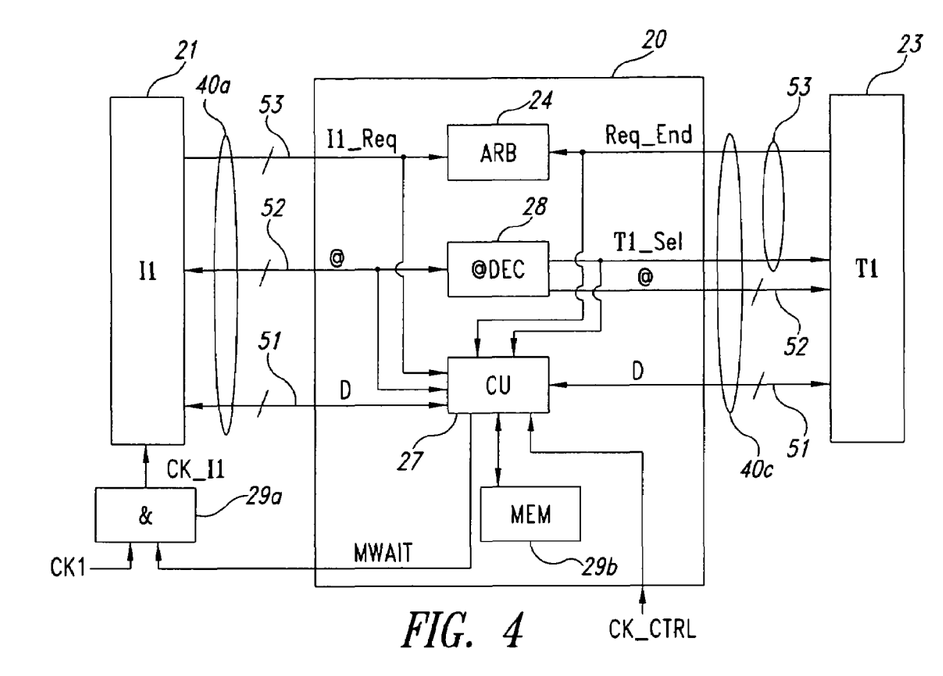
FIG. 4 is a schematic diagram of an exemplary control module useable in a system according to FIG. 2.
Figure 5:
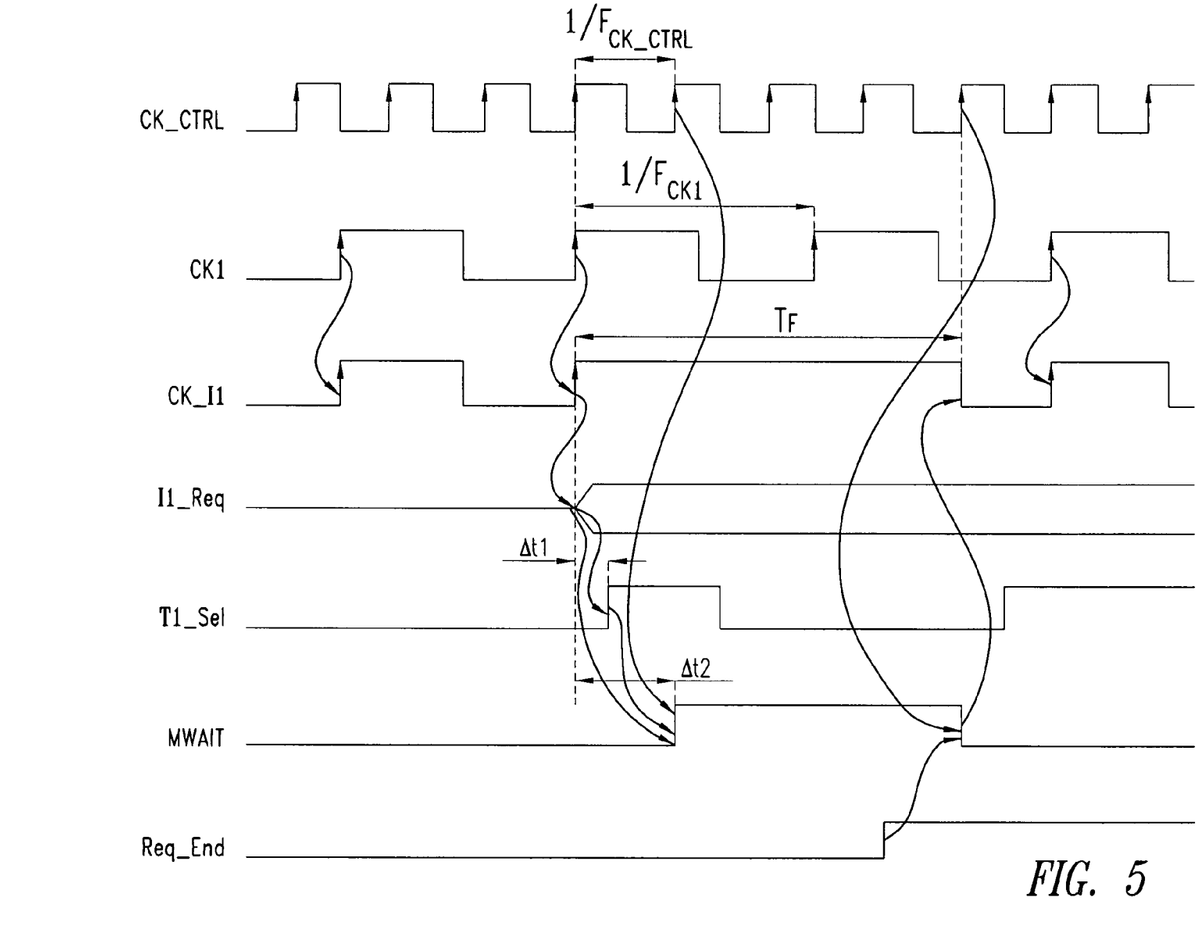
FIG. 5 shows time charts illustrating an exemplary manner of operation of the control module according to FIG. 4.

The timing diagrams of FIG. 4 illustrate an example of the operation of the control unit 27 according to the present invention. In these timing diagrams, the active edges (here the rising edges) of the signals are identified by an arrow (vertical).

The first curve of FIG. 4 shows the clock signal CK_CTRL whose rising edges activate the control module 20. The period of the signal CK_CTRL is denoted by $1/F_{CK\_CTRL}$. The second curve shows the clock signal CK1, whose period is denoted $1/F_{CK1}$. The frequency FCK CTRL of the signal CK_CTRL being at least twice as large as the frequency $F_{CK1}$ of the signal CK1, we have the following relation:

$$\frac{1}{F_{CK\_CTRL}} < \frac{1}{2 \times F_{CK1}} \qquad (1)$$

The third curve shows the signal CK_I1, whose rising edges activate the initiator module 21. Unless the signal CK_I1 is blocked, that is to say is held at the logic state 1, it corresponds to the clock signal CK1. Stated otherwise, the activation signal CK_I1 is obtained by copying the clock signal CK1, except when it is blocked.

It is assumed that, on a determined active edge of the activation signal CK_I1, the initiator module 21 delivers a request for access to the target module 23. This request is conveyed in particular by a multibit control signal I1_Req (fourth curve) placed on the control bus 53 of the bus 40a. Furthermore, it is also conveyed by multibit address signals and data signals (not represented), placed respectively on the address bus 52 and on the data bus 51 of the bus 40a. These signals follow the same timing as the control signal I1_Req. This is why they are not represented in the figure.

After a delay Δt1 which corresponds to the time required for the address decoding, the address decoding unit 28 thereafter sets the signal T1_Sel for selection of the target module 23.

On the next active edge of the clock signal CK_CTRL, the fact that the signal T1_Sel is set and the fact that the signal I1_Req is present on the control bus mean that the control module sets the blocking signal MWAIT. This occurs with a delay Δt2 with respect to the active edge of the signal CK_I1 on which the request has been generated.

It will be noted that, nevertheless, the signal MWAIT thus toggles to the logic 1 state before the next edge of the signal CK_I1, which is a falling edge. This is a consequence of the above relation (1). Stated otherwise, the delay Δt2 is less than half a period of the signal CK1, and hence of the signal CK_I1. It follows that the signal CK_I1 is disabled in the logic 1 state without toggling back through the logic 0 state. Thus, even if the initiator module 21 is designed to read the response data on the next active edge of its activation signal CK_I1, as is the case for a ST7 microcontroller, this read is delayed on account of the freezing of the said activation signal, which thus corresponds to a freezing of the initiator module itself. The processing of the request in progress is therefore suspended as regards the initiator module 21. Of course, the processing of the request is not however suspended as regards the target module 23, which is not frozen and continues to operate normally.

In parallel with this, the control, address and data signals defining the request are copied by the control module of the buses 53, 52 and 51 respectively of the bus 40a, to the buffer memory 29a, for example on the rising edge of the clock signal CK_CTRL which causes the setting of the signal MWAIT. These signals are thereafter reformatted so as to comply with the specifications of the protocol of the bus 40c between the control module 20 and the target module 23.

When the processing of the request in progress is terminated at the level of the target module 23, the latter sets the signal Req_End (that is to say positions it to the logic 1 state)

to indicate this event to the control module 20. On the next active edge of the clock signal CK_CTRL, the control module reinitializes (that is to say sets back to the logic 0 state) the blocking signal MWAIT.

The reinitialization of the blocking signal MWAIT reinitializes the activation signal CK_I1 either immediately if the clock signal CK1 is in the logic 0 state (as in the case represented), or on the next falling edge of the signal CK1 if the latter is then in the logic 1 state. In all cases, the first active edge (rising edge) of the clock signal CK1 following the reinitialization of the blocking signal MWAIT corresponds to the first active edge of the activation signal following that on which the request was initiated.

Thus, the initiator module 21 is placed in a frozen mode at the minimum for a duration TF which allows the target module 23 to terminate the processing of the request. The freezing of the initiator module 21 occurs on the move by virtue of relatively simple hardware means, with no save, nor a fortiori subsequent fetch, of its execution context. It will be noted that the address decoding logic 28 is in any event necessary, so that the invention does not require the addition of such decoding logic.

The invention has been described hereinabove in a preferred but nonlimiting exemplary application.

For example, an embodiment has been described in which the control module 20 incorporates the arbitration unit, the address decoding unit in addition to the control unit. As a variant, the arbitration unit may be stand alone, by being coupled to a communication bus linking the functional modules of the system. Likewise, the decoding unit may be included in an address decoder coupled to such a communication bus. The signal T1_Sel delivered by this address decoder in the case of the decoding of the address of the target module 23 is then likewise received by the control unit 27 of the control module 20 via a control bus.

Furthermore, in the example above, the number N of the functional modules of the system is equal to 3, the number P of initiator modules is equal to 2, and the number Q of target modules is equal to one. Nevertheless, it is of course understood that the invention applies likewise to more complex system architectures, provided that $1 \leq P \leq N$ and $1 \leq Q \leq N$. It will be noted that certain functional modules may be both of initiator type and of target type.

Figure 6:
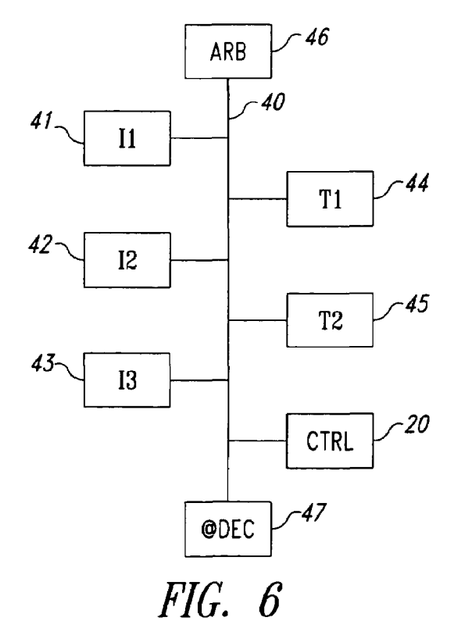
FIG. 6 is a schematic diagram of another exemplary electronic system according to the first aspect of the invention.

By way of illustration, the diagram of FIG. 6 shows the architecture of a system with a communication bus 40. Initiator modules 41, 42 and 43, as well as target modules 44 and 45, are linked to the bus 40. Each of the above modules is linked to the bus 40 by way of a communication port of master type or of slave type depending on whether the module concerned is of initiator type or of target type, respectively. It is recalled that certain modules may be both of initiator type and of target type. In this case, they are linked to the bus 40 via respective ad hoc communication ports.

The system also comprises an address decoder 47 which is linked to the bus 40, and an arbitration module 46, or arbiter, which is also linked to the bus 40 so as to ensure the selection of that one of the initiator modules 41, 42 and 43 which has control of the bus 40 at a determined instant.

The arbitration module 46 can contain the arbitration unit 24 of FIG. 4.

Likewise, the address decoder 47 can contain the address decoding unit 28 of FIG. 4. It will be noted that this decoding unit delivers as many component selection signals (such as the signal T1_Sel of FIG. 4), as there are target modules.

Finally, the control unit 27 of FIG. 4 may be included in the arbitration unit 46. Stated otherwise, the control module 20 may be merged with the arbitration unit 46.

In the embodiment represented, however, the control unit 27 is included in a control module 20 which is coupled to the bus 40. In all cases, the module 20 generates as many blocking signals (such as the signal MWAIT of FIGS. 2 and 4) as there are functional modules to be frozen, basing itself on control signals delivered upon an access request initiated by these initiator modules and on the address of the targeted modules which is posted on the address bus as part of the said request.

Each of the components 41–47 above is linked to the bus 40 which is for example a VCI OCB, in the manner described earlier with reference to the diagram of FIG. 3. For this purpose, certain modules may need a VCI interface, as is the case for the microprocessor ST7, since as they stand they do not support this standard.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention cliamed is:

1. An electronic system comprising:
    an initiator module activated by an active edge of an activation signal generated from a first clock signal having a frequency;
    a target module addressable by the initiator module; and
    a control module activated by an edge of a second clock signal having a frequency, which is at least twice as large as the frequency of the first clock signal, wherein the control module is constructed so as, in response to an access request for access to the target module, initiated by the initiator module on the active edge of the activation signal, to set a blocking signal for blocking the activation signal before the next edge of the activation signal, and to reinitialize the blocking signal on a first active edge of the first clock signal which follows an indication by the target module that processing of the request is terminated at the target module.

2. The system according to claim 1, further comprising an address bus on which an address of the target module is deposited by the initiator module as part of the request for access to the target module, the control module being constructed so as to set the blocking signal with the aid of address decoding logic for decoding the address of the target module.

3. The system according to claim 2 wherein the address decoding logic is constructed so as to set a target module selection signal for selecting the target module in case of decoding of the address of the target module, and wherein the control module is constructed to generate the blocking signal based on the target module selection signal.

4. The system according to claim 2 wherein the address decoding logic is included in the control module.

5. The system according to claim 2, comprising an address decoder which is coupled to the address bus and wherein the address decoding logic is included in the address decoder.

6. The system according to claim 1 wherein the activation signal is generated by a logic circuit based on the first clock signal and the blocking signal.

7. A storage key comprising:
a non-volatile memory; and
a control circuit that is a circuit on a chip that includes:
an initiator module activated by an active edge of an activation signal generated from a first clock signal having a frequency;
a target module addressable by the initiator module; and
a control module activated by an edge of a second clock signal having a frequency, which is at least twice as large as the frequency of the first clock signal, wherein the control module is constructed so as, in response to an access request for access to the target module, initiated by the initiator module on the active edge of the activation signal, to set a blocking signal for blocking the activation signal before the next edge of the activation signal, and to reinitialize the blocking signal on a first active edge of the first clock signal which follows an indication by the target module that processing of the request is terminated at the target module.

8. The storage key according to claim 7, further comprising an address bus on which an address of the target module is deposited by the initiator module as part of the request for access to the target module, the control module being constructed so as to set the blocking signal with the aid of address decoding logic for decoding the address of the target module.

9. The storage key according to claim 8 wherein the address decoding logic is constructed so as to set a target module selection signal for selecting the target module in case of decoding of the address of the target module, and wherein the control module is constructed to generate the blocking signal based on the target module selection signal.

10. The storage key according to claim 8 wherein the address decoding logic is included in the control module.

11. The storage key according to claim 8, comprising an address decoder which is coupled to the address bus and wherein the address decoding logic is included in the address decoder.

12. The storage key according to claim 7 wherein the activation signal is generated by a logic circuit based on the first clock signal and the blocking signal.

13. A method for controlling access to a target module by an initiator module, the method comprising:
activating the initiator module by an activation signal generated from a first clock signal having a frequency;
activating a control module by an edge of a second clock signal having a frequency that is at least twice as large as the frequency of the first clock signal;
in response to an access request for access to the target module initiated by the initiator module, setting a blocking signal by the control module;
using the blocking signal to block the activation signal; and
reinitializing the blocking signal to release the activation signal in response to an indication by the target module that processing of the access request is terminated at the target module.

14. The method of claim 13, further comprising depositing an address of the target module on an address bus as part of the request for access to the target module, wherein setting the blocking signal is performed by the control module with the aid of address decoding logic for decoding the address of the target module.

15. The method of claim 14, further comprising setting a target module selection signal to select the target module in response to decoding the address of the target module, wherein setting the blocking signal is performed based on the target module selection signal.

16. The method of claim 14 wherein the address decoding logic is included in the control module.

17. The method of claim 14, wherein an address decoder is coupled to the address bus and wherein the address decoding logic is included in the address decoder.

18. The method of claim 13 wherein the activation signal is generated based on a logical combination of the first clock signal and the blocking signal.

19. The method of claim 13 wherein the initiator module initiates the access request on a first edge of the activation signal and the control module sets the blocking signal before a second edge of the activation signal immediately following the first edge.

* * * * *